May 15, 1945.    J. GRIGALAUSKI    2,375,916
TOOL HOLDER
Filed Nov. 9, 1942
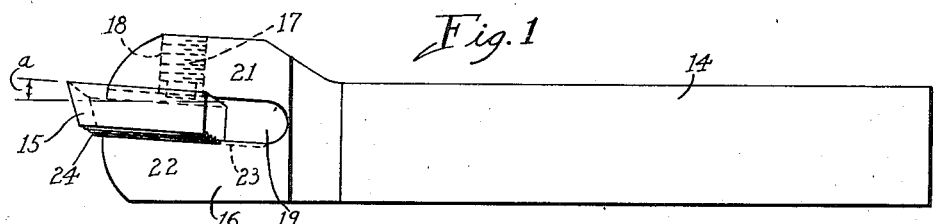
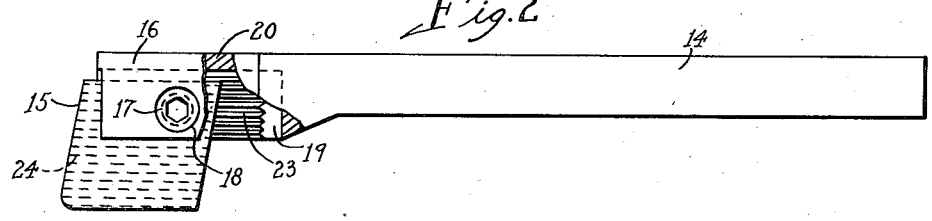
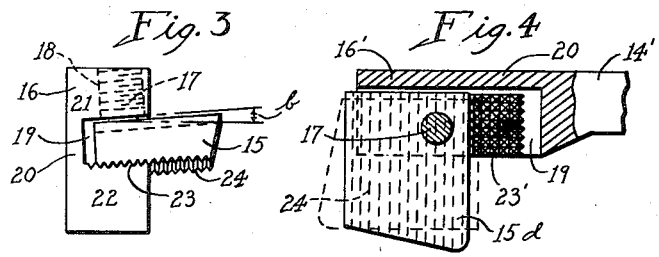
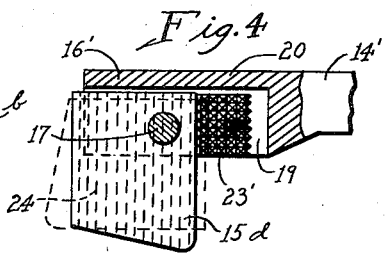
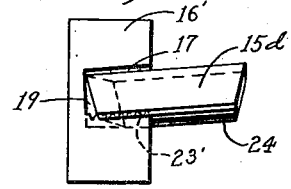
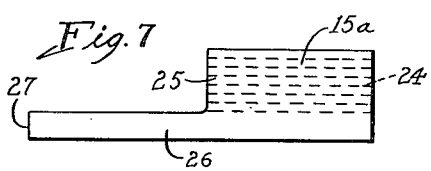
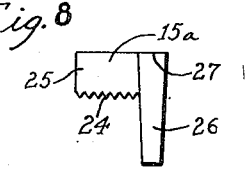
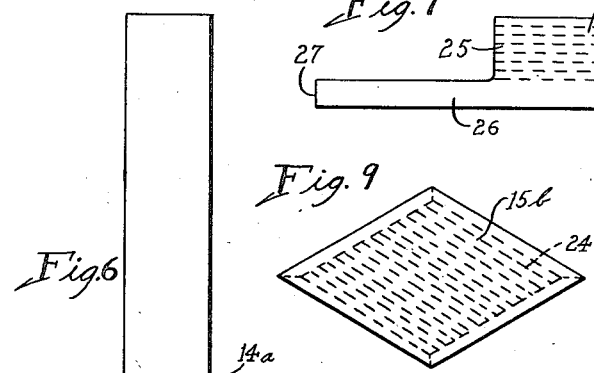
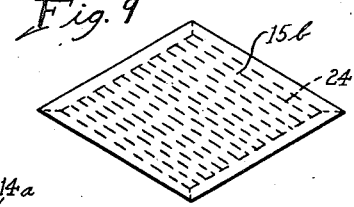
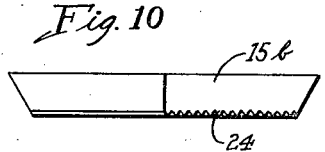
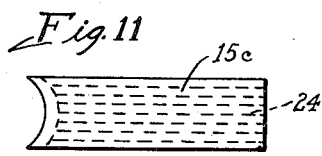
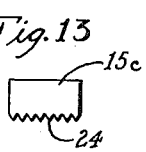
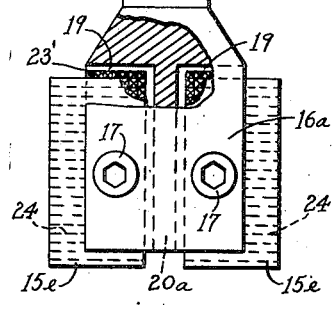
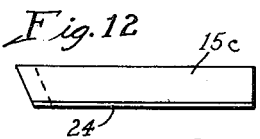
Inventor:
Joseph Grigalauski
By McCanna, Wintercorn
& Morsbach
Attys.

Patented May 15, 1945

2,375,916

UNITED STATES PATENT OFFICE 2,375,916

TOOLHOLDER

Joseph Grigalauski, Rockford, Ill.

Application November 9, 1942, Serial No. 464,953

12 Claims. (Cl. 29—97)

This invention relates to an improved form of tool holder and interchangeable and adjustable bits therefor.

The principal object of my invention is to provide a thoroughly practical and more efficient tool holder and bit assembly, which despite its features providing a wide range of adjustability nevertheless provides the required rigidity for close work.

Another object is to provide an improved tool holder and bit assembly, in which the supporting shank portion of each bit is of uniform thickness as distinguished from specially shaped bits proposed by others, the bit being adjustable longitudinally and laterally in a longitudinally inclined and laterally inclined slot in the holder, so that regardless of adjustment, the same predetermined rake and shear angles are maintained.

Still another object consists in the provision of a tool holder and bit assembly as just described, which in the preferred form has longitudinally extending serrations in the bottom of the slot to cooperate with longitudinally extending serrations on the bottom of the bits, a modified form being contemplated in which the serrations in the tool holder extend not only longitudinally but laterally also to receive the longitudinally extending serrations on the bits, with the bits entered from the end or side of the tool holder; and still another object consists in providing a single set screw in a hole in the top portion of the tool holder inclined rearwardly and laterally so that the set screw is normal to the bit to be clamped thereby.

A further object of the invention is to provide a tool holder of the kind mentioned, in which the bit receiving slot extends for only part of the width thickness of the end portion of the holder, so as to leave a connecting upright web portion for strength and rigidity.

A further object is to provide a tool holder and bit assembly of the kind just mentioned, which may be made right handed or left handed, as best suits requirements, and in a modified form is made of a dual type having both right and left hand slots to receive two bits at a time, or one bit at a time in either slot, according to the requirements of the work to be done.

These and other objects of the invention will appear in the course of the following description, in which reference is made to the accompanying drawing, wherein—

Fig. 1 is a side view of a tool holder and bit assembly made in accordance with my invention;

Fig. 2 is a top view of said assembly with a portion broken away to better illustrate the construction of the tool holder;

Fig. 3 is an end view;

Fig. 4 is a fragmentary view of a tool holder and bit assembly of modified or alternative construction, a portion of the holder shank being broken off to conserve space, and the head end thereof being shown in horizontal section to better illustrate the construction;

Fig. 5 is an end view of Fig. 4;

Fig. 6 is a top or face view of another tool holder and bit assembly of modified or alternative construction;

Figs. 7 and 8 are two views of an improved cut-off bit adapted for use in the tool holders of Figs. 1 to 5;

Figs. 9 and 10 are two views of a threading bit also adapted for use in the aforesaid tool holders, and Figs. 11, 12, and 13 are three views of a radius-cutting bit adapted for use in the aforesaid tool holders.

Similar reference numerals are applied to corresponding parts throughout the views.

The tool holder and bit assembly shown in Figs. 1 to 3 is adapted for use on planers, shapers, lathes, and other machine tools, the usual means being provided thereon for clamping the shank portion 14 of the tool holder so as to present the bit or blade 15 to the work. The bit is clamped in the enlarged head end portion 16 of the tool holder by means of a set screw 17. The hole 18 in the upper portion of the head threadedly receiving the set screw is inclined rearwardly and laterally, as indicated in Figs. 1 and 3, so as to be normal to the plane of the slot 19 and the bit set therein. The slot 19 extends longitudinally in the head end portion 16, but for only a portion of the width thereof, leaving the upright connecting web portion 20 along one side of the slot connecting the upper and lower portions 21 and 22 for strength and rigidity and to withstand the strains set up in the head portion 16 when the set screw 17 is tightened. The slot 19 is inclined downwardly and rearwardly from a horizontal, as indicated by the angle a in Fig. 1, and is also inclined laterally from a horizontal, preferably though not necessarily at the same angle, as indicated at b in Fig. 3. This inclination of the slot gives the desired inclination of the slot gives the desired inclination to the bit 15 seated therein, thus determining a definite predetermined rake and shear angle, which angularity is maintained in any position of adjustment of the bit in the slot, once the tool holder has been properly clamped in the turret, or other tool support, provided, such as a lathe cross-head or boring mill head. The slot 19 is of substantially uniform width and height from end to end, and is serrated longitudinally on the bottom thereof, as indicated at 23, to match longitudinal serrations 24 provided on the bottom of the bit 15, and inasmuch as the bit is of uniform thickness throughout, the thickness being small enough to permit of easy entry of the bit in the slot, it should be clear that the bit may be adjusted endwise to a desired position and clamped, and that it may also be withdrawn and reset to the right or left as the work to be done may require. The two-way adjustability of the bit greatly facilitates working with this device, because as the bit wears it can be withdrawn, ground, and reset without disturbing the holder, so that the original set-up of the machine is preserved and much valuable time otherwise lost is saved. Also it is at once manifest that the two-way adjustability enables the operator to use the same bit over and over again, after repeated grindings, until there is only a small fraction of the original bit remaining, just enough to do the work. It is also manifest that with one tool holder the operator can have a large number of different styles and kinds of bits, all usable interchangeably in the same holder, as, for example, a cut-off bit like that shown at 15a in Figs. 7 and 8, a threading bit like that shown at 15b in Figs. 9 and 10, and a radius-cutting bit like that shown at 15c in Figs. 11, 12, and 13, as well as a large number of others, such as forming bits, angular bits, turning bits, and the like. The bit 15 of Figs. 1 to 3 is a turning bit, and the bit 15d of Figs. 4 and 5 is an angular bit. The so-called high speed or cemented carbide tipped bits, when made to fit the present tool holder and serrated like the others, may also be used. With the present construction, the adjustment feature in no way interferes with rigidity of the tool bit once the bit is properly clamped with the set screw. There is found to be no tendency for chattering. The angles a and b, determining rake and shear, will, of course, be changed in different tool holders to suit the requirements when working with different materials and to suit different special operations, the angles shown being medium so as to make the device suitable for all around work.

In some instances, four-way adjustability of the tool bit may be found desirable, and with that thought in mind, I have illustrated in Figs. 4 and 5 a tool holder 14', the head portion 16' of which is slotted in the same manner as the other tool holder just described, as indicated at 19, to receive a tool bit which may be clamped with a set screw 17 in the same manner as previously described. The serrations 23', however, extend lengthwise and crosswise of the bottom of the slot 19 to receive the longitudinal serrations 24 of the tool bit, with the bit entered either from the end of the tool holder, as indicated in dotted lines in Fig. 4, or from the side, as indicated in full lines in Figs. 4 and 5. The set screw 17 serves to clamp the bit when entered either way. Now, of course, the operator may use one style of bit in this holder, entering it always from the end, and use another style of tool bit in the holder, entering it always from the side. In certain operations it is easily seen how such interchangeability and adjustability will speed up production. A bit entered from the end of the holder is adjustable lengthwise as well as laterally with respect to the tool holder, and a bit entered from the side is adjustable also lengthwise and laterally with respect to the tool holder, thus making the bit adjustable four ways. The same advantages in so far as maintaining rake and shear angles in the adjustment of the bit are obtained with this construction as with the other first described. An important added advantage of this construction lies in the fact that the bit can be set with the serrations 24 always at right angles to the surface of the work being operated upon, that being important from the standpoint of reducing likelihood of breakage. In other words, the cutting of the serrations 24 in one side of the tool bits renders them somewhat more susceptible to breakage only if the cutting edge of the bit extends parallel or nearly so with respect to the serrations, whereas there is no perceptible reduction in fracture resistance if the serrations extend at right angles to or crosswise with respect to the cutting edge of the bit.

Tool holders may be made right or left handed as the operator may require for different kinds of work, and while an operator may have tool holders of both hands, I also contemplate a combined right and left handed tool holder, like that shown at 14a in Fig. 6, having right and left slots 19 in the head end 16a separated by the web portion 28a. Two bits 15e are shown in the two slots clamped by set screws 17. A tool holder and bit assembly of this construction could be used in a planer with the shank held vertically and the bits projecting from the opposite sides thereof to make finishing cuts on the opposite sides of the narrow portion of a T-slot, for example, making one cut first with one bit and then with the other, or with both bits simultaneously. The bits 15e are both shown provided with serrations 24 for two-way adjustment with respect to the serrations 23 or 23' in the slots 19.

The bits shown in Figs. 7 to 13 all have attaching shank portions of uniform thickness to permit use thereof in a tool holder like that shown in Figs. 1 to 3, for example. In each instance the serrations 24 extend lengthwise of the bit in transverse relation to the cutting edge portion. All of the bits, with the exception of that shown in Figs. 7 and 8, are otherwise fairly conventional. The latter has the attaching shank portion 25 in a plane at right angles to the elongated cutter portion 26 and spaced rearwardly appreciably with respect to the cutting end 27, so that the tool will stand numerous grindings before it is no longer fit for use. When this bit is placed in the tool holder of Figs. 1, 2, and 3 with the shank portion 25 entered in the slot 19 and the cutter portion 26 disposed alongside the head end portion 16, a very efficient assembly is provided for cut-off operations, and it is a simple matter to remove the bit from time to time, regrind it, and reset it in the holder.

It is believed the foregoing description conveys a good understanding of the objects and advantages of my invention. The appended claims have been drawn to cover all legitimate modifications and adaptations.

I claim:

1. A cutter tool comprising, in combination, an elongated tool holder having a cutter blade receiving slot provided therein extending longitudinally a predetermined distance inwardly from the end thereof and laterally from one side part way to the other side, whereby to provide a connecting side wall between the opposed portions of the holder above and below said slot to resist separation thereof, a set screw threaded in a hole provided in one of the opposed portions of said holder for clamping a cutter blade set in said slot, and a cutter blade fitting freely in said slot and adapted to be adjusted therein relative to said screw laterally toward or away from said connecting side wall and longitudinally relative to said holder toward or away from the inner end of said slot before the screw is tightened.

2. A cutter tool, comprising, in combination, an elongated tool holder having a cutter blade receiving slot provided therein extending longitudinally a predetermined distance inwardly from the end thereof and laterally from one side part way to the other side, whereby to provide a connecting side wall between the opposed portions of the holder above and below said slot to resist separation thereof, said slot being inclined from a horizontal plane both longitudinally and laterally relative to said holder to predetermine the rake and shear angles of a cutter blade set in said slot, a set screw threaded in a hole provided in one of the opposed portions of said holder for clamping a cutter blade set in said slot, and a cutter blade fitting freely in said slot and adapted to be adjusted therein relative to said screw laterally toward or away from said connecting side wall and longitudinally relative to said holder toward or away from the inner end of said slot before the screw is tightened.

3. A cutter tool, comprising, in combination, an elongated tool holder having a cutter blade receiving slot provided therein extending longitudinally a predetermined distance inwardly from the end thereof and laterally from one side part way to the other side, whereby to provide a connecting side wall between the opposed portions of the holder above and below said slot to resist separation thereof, a set screw threaded in a hole provided in one of the opposed portions of said holder for clamping a cutter blade set in said slot, said slot having longitudinally extending serrations on that side thereof opposite the set screw, and a cutter blade fitting freely in said slot and adapted to be adjusted therein relative to said screw laterally toward or away from said connecting side wall and longitudinally relative to said holder toward or away from the inner end of said slot before the screw is tightened, said blade having longitudinally extending serrations provided on one side thereof to match and enter the serrations in said slot for sliding adjustment of the blade.

4. A cutter tool, comprising, in combination, an elongated tool holder having a cutter blade receiving slot provided therein extending longitudinally from the end thereof and laterally from one side part way to the other side, whereby to provide a connecting wall between the opposed portions of the holder above and below said slot to resist separation thereof, a set screw threaded in a hole provided in one of the opposed portions of said holder for clamping a cutter blade set in said slot, said slot having longitudinally and transversely extending serrations on that side thereof opposite the set screw, and a cutter blade fitting freely in said slot and adapted to be adjusted therein relative to said screw laterally and longitudinally relative to said holder before the screw is tightened, said blade having longitudinally extending serrations provided on one side thereof to match and enter either set of serrations in said slot for sliding adjustment of the blade longitudinally or transversely with respect to the holder.

5. A cutter tool, comprising, in combination, an elongated tool holder having a cutter blade receiving slot provided therein extending longitudinally a predetermined distance inwardly from the end thereof, whereby to provide opposed portions above and below said slot, said slot being inclined from a horizontal plane both longitudinally and laterally relative to said holder to predetermine the rake and shear angles of a cutter blade set in said slot, a set screw threaded in a hole provided in one of the opposed portions of said holder for clamping a cutter blade set in said slot, and a cutter blade fitting freely in said slot and adapted to be adjusted therein relative to said screw laterally and longitudinally relative to said holder before the screw is tightened.

6. A cutter tool, comprising, in combination, an elongated tool holder having a cutter blade receiving slot provided therein extending longitudinally a predetermined distance inwardly from the end thereof, whereby to provide opposed portions above and below said slot, said slot being inclined from a horizontal plane both longitudinally and laterally relative to said holder to predetermine the rake and shear angles of a cutter blade set in said slot, a set screw threaded in a hole provided in one of the opposed portions of said holder for clamping a cutter blade set in said slot, said slot having longitudinally extending serrations on that side thereof opposite the set screw, and a cutter blade fitting freely in said slot and adapted to be adjusted therein relative to said screw laterally and longitudinally relative to said holder before the screw is tightened, said blade having longitudinally extending serrations provided on one side thereof to match and enter the serrations in said slot for sliding adjustment of the blade.

7. A cutter tool, comprising, in combination, an elongated tool holder having a cutter blade receiving slot provided therein extending longitudinally a predetermined distance inwardly from the end thereof, whereby to provide opposed portions above and below said slot, a set screw threaded in a hole provided in one of the opposed portions of said holder for clamping a cutter blade set in said slot, said slot having longitudinally and transversely extending serrations on that side thereof opposite the set screw, and a cutter blade fitting freely in said slot and adapted to be adjusted therein relative to said screw laterally and longitudinally relative to said holder before the screw is tightened, said blade having longitudinally extending serrations provided on one side thereof to match and enter either set of serrations in said slot for sliding adjustment of the blade longitudinally or transversely with respect to the holder.

8. A cutter tool, comprising, in combination, an elongated tool holder having two cutter blade receiving slots provided therein extending longitudinally a predetermined distance inwardly from the end thereof on opposite sides thereof, whereby to provide between the slot a connecting wall joining the opposed portions of the holder above and below said slots to resist separation thereof, a set screw associated with each of said slots threaded in a hole provided in one of the opposed portions of said holder for clamping a cutter blade set in said slot, each of said slots having transversely extending serrations provided therein on that side thereof opposite the set screw; and cutter blades fitting freely in said slots and adapted to be adjusted therein relative to said screws laterally and longitudinally relative to said holder before the screws are tightened, said blades having serrations provided on one side thereof to match and enter the serrations in said slots for sliding adjustment of the blades.

9. A cutter blade, comprising an elongated cutter body portion of substantially rectangular cross-section disposed in one plane and adapted to be ground at one end thereof to provide a cutting edge, and an attaching portion of substantially rectangular cross-section disposed entirely on one side of the plane of the body portion, in a transverse plane and integral with one longitudinal edge portion at one end portion of the cutter body remote from the cutting edge.

10. A cutter tool, comprising, in combination, an elongated tool holder having a cutter blade receiving slot provided therein extending longitudinally a predetermined distance inwardly from the end thereof and laterally from one side part way to the other side, whereby to provide a connecting side wall between the opposed portions of the holder above and below said slot to resist separation thereof, said slot being inclined from a horizontal plane laterally relative to said holder to predetermine the shear angle of a cutter blade set in said slot, a set screw threaded in a hole provided in one of the opposed portions of said holder for clamping a cutter blade set in said slot, and a cutter blade fitting freely in said slot and adapted to be adjusted therein relative to said screw laterally toward or away from said connecting side wall and longitudinally relative to said holder toward or away from the inner end of said slot before the screw is tightened.

11. A cutter tool, comprising, in combination, an elongated tool holder having a cutter blade receiving slot provided therein extending longitudinally a predetermined distance inwardly from the end thereof, whereby to provide opposed portions above and below said slot, said slot being inclined from a horizontal plane laterally relative to said holder to predetermine the shear angle of a cutter blade set in said slot, a set screw threaded in a hole provided in one of the opposed portions of said holder for clamping a cutter blade set in said slot, and a cutter blade fitting freely in said slot and adapted to be adjusted therein relative to said screw laterally and longitudinally relative to said holder before the screw is tightened.

12. A cutter tool, comprising, in combination, an elongated tool holder having a cutter blade receiving slot provided therein extending longitudinally a predetermined distance inwardly from the end thereof and laterally from one side part way to the other side, whereby to provide a connecting side wall between the opposed portions of the holder above and below said slot to resist separation thereof, said slot being inclined from a horizontal plane longitudinally relative to said holder to predetermine the rake angle of a cutter blade set in said slot, a set screw threaded in a hole provided in one of the opposed portions of said holder for clamping a cutter blade set in said slot, and a cutter blade fitting freely in said slot and adapted to be adjusted therein relative to said screw laterally toward or away from said connecting side wall and longitudinally relative to said holder toward or away from the inner end of said slot before the screw is tightened.

JOSEPH GRIGALAUSKI.